No. 795,097. PATENTED JULY 18, 1905.
E. L. BRANSON.
AUTOMATIC SAFETY STOPPING ATTACHMENT FOR MACHINERY.
APPLICATION FILED JAN. 31, 1905.

2 SHEETS—SHEET 1.

No. 795,097. PATENTED JULY 18, 1905.
E. L. BRANSON.
AUTOMATIC SAFETY STOPPING ATTACHMENT FOR MACHINERY.
APPLICATION FILED JAN. 31, 1905.

2 SHEETS—SHEET 2.

WITNESSES:
C. H. Walker.
James P. Mansfield

INVENTOR
Edward L. Branson
By
Alexander Burrell, Attorneys

No. 795,097.

Patented July 18, 1905.

UNITED STATES PATENT OFFICE.

EDWARD L. BRANSON, OF BATTLECREEK, MICHIGAN.

AUTOMATIC SAFETY STOPPING ATTACHMENT FOR MACHINERY.

SPECIFICATION forming part of Letters Patent No. 795,097, dated July 18, 1905.

Application filed January 31, 1905. Serial No. 243,474.

*To all whom it may concern:*

Be it known that I, EDWARD L. BRANSON, of Battlecreek, in the county of Calhoun and State of Michigan, have invented certain new and useful Improvements in Automatic Safety Stopping Attachments for Machinery; and I hereby declare that the following is a full, clear, and exact description thereof, reference being had to the accompanying drawings, which form part of this specification.

This invention is an automatic safety stopping attachment for machinery, especially designed for use on machines having reciprocating parts between which the material to be operated upon is fed by hand, such as platen-presses and cutting-machines, but it is also applicable to other manually-fed machines; and its object is to provide mechanism for automatically stopping the machine in case the operator's fingers or limbs should be accidentally or negligently caught between the moving parts, so that the operator will not be seriously injured.

In the accompanying drawings I have illustrated the invention as adapted to a platen-press or cutting-machine and will describe it with reference thereto; but the invention is not restricted to any particular size or kind of machine, as will be readily comprehended when its construction and operation are understood.

The invention embodies novel tripping mechanism and novel mechanism controlled by the trip for disengaging a clutch device which imparts motion from the driving to the driven parts and also novel devices which act as a brake in stopping the movement of the driven part.

Figure 1:
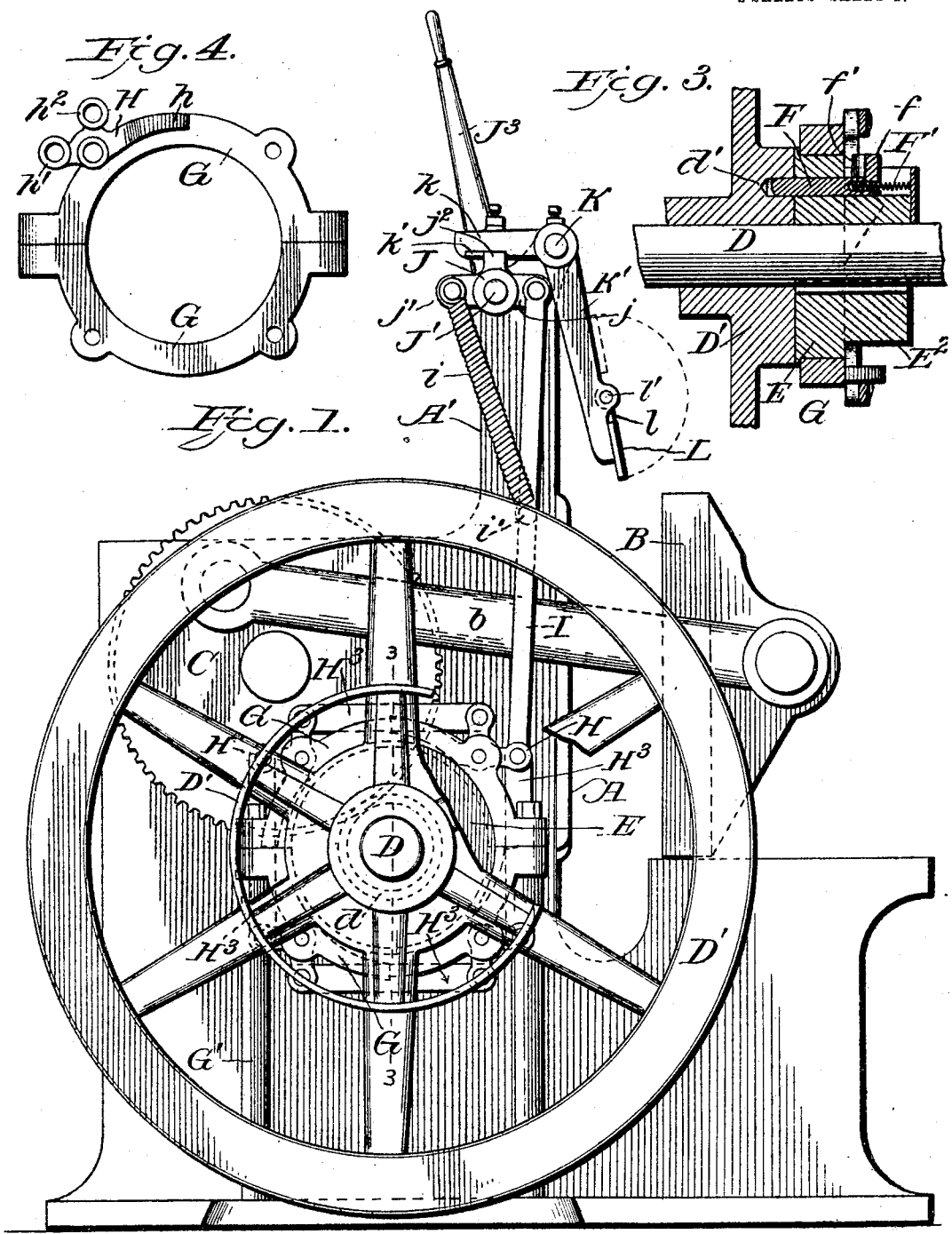
Figure 2:
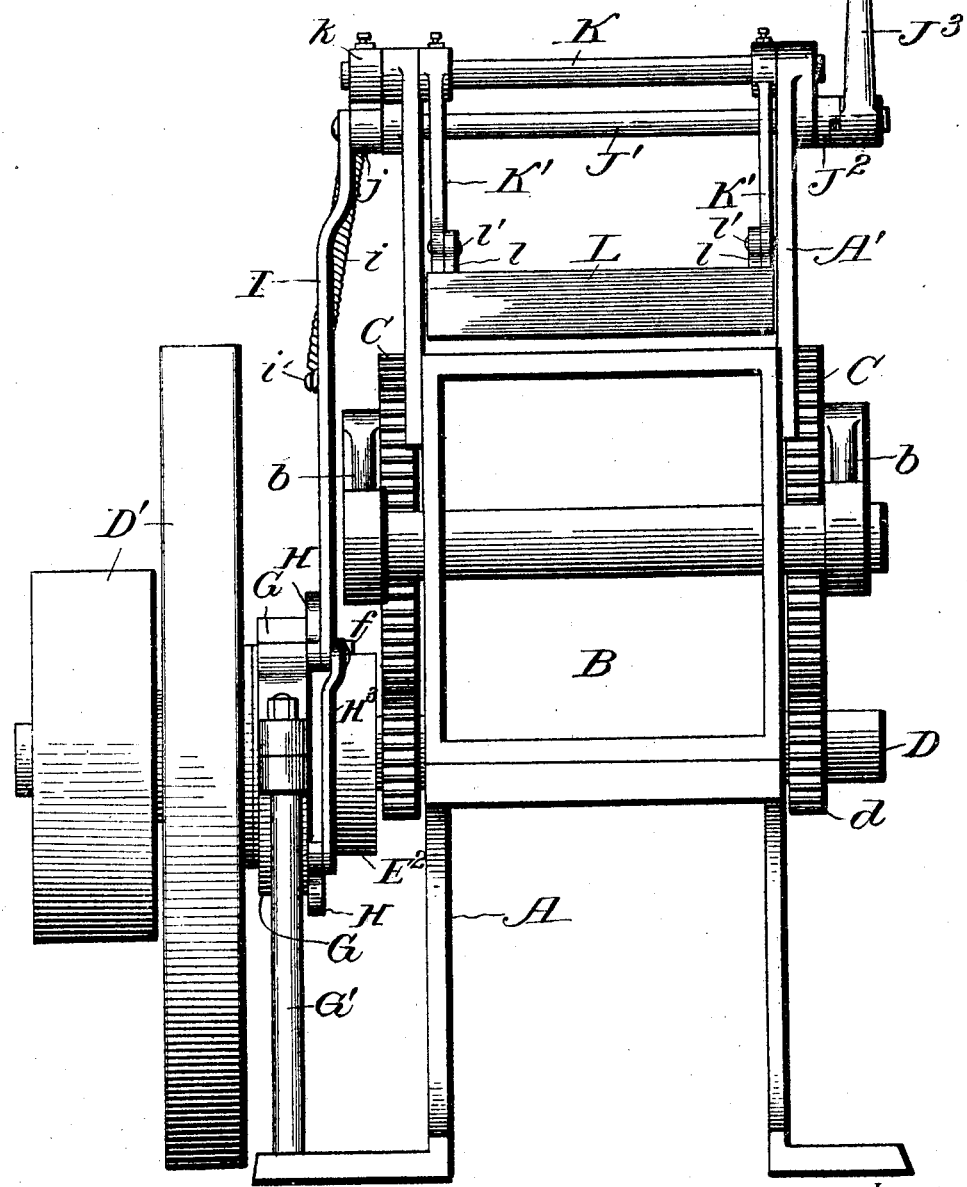

In the accompanying drawings, Figure 1 is a detail side elevation of devices embodying the invention as applied to a platen-press. Fig. 2 is a front view thereof. Fig. 3 is a section on line 3 3, Fig. 1, enlarged. Fig. 4 is a detail view of the stationary ring, showing one of the clutch-tripping levers attached thereto.

A represents the bed of an ordinary platen-press or cutting-machine, opposed to which is a platen B, which is reciprocated to and from the bed by means of pitmen $b$, connected to crank-pins on gears C, which mesh with small pinions $d$ on main shaft D, on which is loosely mounted a belt and fly-wheel D', by which motion can be communicated to shaft D through a suitable clutch device. In the construction shown a disk E is keyed to shaft D and has a longitudinal opening in it, through which plays a clutch-bolt F, pressed inward by a spring F', the inner end of the bolt being adapted to engage a recess $d'$ in the adjacent end of the hub of wheel D' when the bolt is pushed inward by spring F'. The bolt has an outwardly radially extending head or lug $f$ on its outer end, which is beveled on its inner face, as shown at $f'$, for engagement with bolt-retracting devices, hereinafter explained. Disk E is surrounded by a stationary ring, which may be conveniently formed in upper and lower halves G G, rigidly connected to and supported by standards G', attached to the floor or base of the machine, or the ring may be supported concentric with the disk in other convenient and preferred manner. On this ring are pivoted clutch-tripping levers H, four being shown, said levers being arranged to oscillate in a plane at right angles to the shaft, and their inner ends $h$ are adapted to be moved into the path of the beveled head $f$ on the bolt F and are beveled or tapered laterally, so that when thrown into the path of head $f$ they will act as cams to cause bolt F to disengage wheel D'. The parts $h$ are also curved to fit the curvature of the reduced portion of hub $E^2$ of the disk E, so that parts $h$ will serve as friction-brakes to arrest the motion of the shaft D when pressed against the hub $E^2$.

Each lever H has a short rearward projection $h'$, extending oppositely to part $h$, and an intermediate projection $h^2$, extending approximately at right angles to parts $h$ $h'$. The adjacent levers are connected by links $H^3$, so that all move simultaneously and alike, the links being pivoted at one end to arm $h'$ of one lever and at the other end to arm $h^2$ of the next adjacent lever, as clearly shown in the drawings. The levers are automatically moved into position to disengage the clutch-bolt F from wheel D' and stop shaft D by the following means: To the arm $h'$ of one of the levers is pivoted one end of a rod I, which is pivoted at its other end to one arm $j$ of a lever J, which is preferably secured on one end of a rock-shaft J', journaled in standards A', attached to the press-bed and extending above the latter. The arm $j''$ of lever J directly opposite arm $j$ is connected to one end of a stout helical spring $i$, the other end of which is attached to rod I at the point $i'$ some distance below the arm $j$, and said spring tends to draw the points $j''\ i'$ together, and thus to pull rod I upward, which movement of the rod causes levers H to oscillate on their pivots and throw their arms $h$ into the path of the head $f$ of bolt F.

In order to hold rod I down and keep the levers H raised out of the path of bolt F, lever J has an intermediate upstanding arm $j^2$, which is adapted to engage a catch $k'$ on an arm $k$, attached to a rock-shaft K, journaled in standards A' above and parallel with shaft J'. As long as arm $j^2$ is retained by catch $k'$ rod I will be held down, spring $i$ tensioned, and levers H held with arms $h$ raised out of the path of clutch-bolt F, so that disk E and wheel D' will be interlocked by said bolt and the machine be in operative condition.

To shaft K are attached arms K', which depend toward the platen, but terminate a few inches above the bed. To these arms are pivoted at $l'$ hinge-lugs $l$ on the upper edge of a trip-board L, which when lowered is prevented from backward swing by the extremities of arms K', which project below the pivots $l'$.

Operation: When the trip-board L is in the position shown in full lines in Fig. 1, it lies in advance of the upper edge of the bed and in such position that if the operator's hands or arms should come between the bed and platen they would be caught between the trip-board and top of platen before the platen could complete its inward movement, and the pressure on the trip-board would move it back, thereby rocking shaft K and causing catch $k'$ to disengage arm $j^2$, whereupon spring $i$ would throw rod I upward and the rod would rock levers H, and arms $h$ of the levers would be thrown into position to engage the beveled head $f$ of bolt F, and as the latter moves past arm $h$ it would be forced out of engagement with wheel D', which would be released from the disk and then rotate idly, while the shaft D and parts operated thereby stop. The movement of the platen and parts for operating it from shaft D are relatively slow as compared with the rotation of wheel D', and the momentum of such parts would not ordinarily be sufficient to complete the movement of platen B when the clutch-bolt is disengaged from wheel D', but the parts $h$ of the levers pressing against the hub of the disk E act as frictional brakes to arrest the motion of the parts practically instantaneously. By this means painful and serious accidents can be easily prevented, and the utility of the invention is apparent. The trip-board L can be swung up out of the way, as indicated in dotted lines, Fig. 1, when forms or dies are to be put in or taken from the press. In order to reset the device and start the machine again, shaft J' may have a notched collar $J^2$ secured to its end and adapted to be loosely engaged by a key or wrench-lever $J^3$. This lever may, if desired, be mounted on the shaft so as to normally incline backward, and thus assist the spring $i$ in the automatic action of the apparatus.

Having thus described my invention, what I claim as new, and desire to secure by Letters Patent, is—

1. In combination with a manually-fed machine having a driving-shaft, a driving-wheel, and a device for locking the wheel to the shaft; of means for disengaging the said device, a catch for holding said disengaging means in inactive position, and a trip located adjacent to the feeding-point of the machine, adapted to be actuated by the fingers or limbs of the operator if they are caught in the machine, whereby the disengaging means are operated to stop the machine before the operator is injured.

2. In combination, a manually-fed machine having a driving-shaft, a driving-wheel, and a clutch for locking the wheel to the shaft; of means for disengaging the said clutch, a spring-actuated rod for controlling said means; a catch for holding said rod in inactive position, and a trip located adjacent to the feeding-point of the machine, adapted to be actuated by the fingers or limbs of the operator if they are caught in the machine, whereby the clutch is released to stop the machine before the operator is injured.

3. In combination with a manually-fed machine having a driving-wheel, and clutch devices for transmitting motion from the driving-wheel to the operative parts of the machine; with spring-controlled mechanism for disengaging the clutch devices when released, means for holding said disengaging devices in inactive condition while the machine is in operation, and a movable trip-board connected with said means, adapted to be actuated by the fingers or limbs of the operator if caught in the machine whereby the spring-controlled mechanism is released and the machine stopped before the operator is injured.

4. In combination with a platen-machine adapted to be fed by hand; and having a driving-wheel, a driven shaft and clutch devices for locking the wheel to the shaft; with means for disengaging the clutch devices from the shaft, a rod connected to said devices, a lever connected to said rod, a spring connected to said lever and rod, adapted to cause the rod to throw the disengaging devices into operative position; a catch for holding the lever and spring in inactive position, and a trip-board connected to said catch and adapted to be actuated by the fingers or limbs of the operator if caught in the machine, substantially as described.

5. In combination with a machine having a reciprocating part, a driven shaft, a driving-wheel, and clutch devices for locking the wheel to the shaft; means for disengaging the clutch, a rod controlling said means, a spring connected to said rod and adapted to throw it into operative position; a catch to hold the rod and spring inactive, a rock-shaft carrying said shaft, and a trip-board connected to said rock-shaft and adapted to be actuated by the operator's hands or limbs if caught between the trip-board and reciprocating part, substantially as and for the purpose described.

6. In combination with a manually-fed machine having a clutch for locking the driven to the driving part; of a movable rod controlling said clutch; a rocking lever connected to said rod, a spring connected to said rod and lever adapted to throw the rod into operative position; a catch engaging said lever for holding the rod in inactive position; a rock-shaft carrying said catch, and a trip-board connected to said shaft.

7. In combination with a machine having a reciprocating platen, a driven shaft, a driving-wheel, and clutch devices for locking the wheel to the shaft; means for disengaging the clutch, a rod controlling said means, an oscillating lever connected to said rod, a spring connected to the other end of the said lever and to said rod, adapted to throw the rod into operative position; a catch engaging said lever to hold the rod and spring inactive, a rock-shaft carrying said shaft, arms depending from said rock-shaft toward the platen, and a trip-board connected to said arms and lying above the path of movement of the platen.

8. In a platen-machine, the combination of the driven shaft, the driving-wheel thereon, means for locking the wheel to the shaft, and means for disengaging the locking means; with an oscillating lever, a rod connected to one end of said lever and to the disengaging devices; a spring connected to the other end of said lever and to said rod, adapted to throw the rod into active position; a rock-shaft, a catch thereon engaging said rocking lever to hold the rod and spring inactive, arms depending from said rod toward the feed-point of the machine, and a trip-board connected to said arms.

9. In combination, a driven shaft, a disk keyed thereon, a driving pulley or wheel loosely mounted on the shaft beside the disk, a clutch for locking the disk to the wheel, and a ring surrounding the disk, a cam-lever on said ring adapted to cause the clutch to disengage the wheel; with a rod connected to said cam-levers, a spring adapted to cause the rod to move the cam-levers into operative position, a catch for holding the rod and spring inactive, and a trip located at the feed-point of the machine, adapted to release the catch if the hands of the operator be accidentally caught.

10. In combination, a driven shaft, a disk keyed thereon, a driving pulley or wheel loosely mounted on the shaft beside the disk, a clutch-bolt for locking the disk to the wheel, and a ring surrounding the disk carrying a set of cam-levers adapted to be thrown into the path of the clutch-bolt and cause it to disengage the wheel; with a rocking lever, a rod connecting said lever with said cam-levers, a spring connecting said rocking lever and rod and adapted to cause the rod to move the cam-levers into operative position; a catch for holding the rod and spring inactive, and a trip located at the feed-point of the machine, adapted to release the catch if the hands of the operator be accidentally caught.

In testimony that I claim the foregoing as my own I affix my signature in presence of two witnesses.

EDWARD L. BRANSON.

In presence of—
  John F. Byrne,
  E. M. Johnson.